(12) United States Patent
Van Esch

(10) Patent No.: US 12,044,519 B2
(45) Date of Patent: Jul. 23, 2024

(54) MEASURING ARM AND PROCESS FOR INSPECTING CONTOURS

(71) Applicant: Tom Van Esch, Waterford, MI (US)

(72) Inventor: Tom Van Esch, Waterford, MI (US)

(*) Notice: Subject to any disclaimer, the term of this patent is extended or adjusted under 35 U.S.C. 154(b) by 0 days.

(21) Appl. No.: 17/333,912

(22) Filed: May 28, 2021

(65) Prior Publication Data

US 2021/0372780 A1 Dec. 2, 2021

Related U.S. Application Data

(60) Provisional application No. 63/031,264, filed on May 28, 2020.

(51) Int. Cl.
| | |
|---|---|
| *G01B 21/22* | (2006.01) |
| *G01B 5/00* | (2006.01) |
| *G01B 5/20* | (2006.01) |
| *G01B 11/24* | (2006.01) |
| *G01B 21/20* | (2006.01) |

(52) U.S. Cl.
CPC ............ *G01B 11/24* (2013.01); *G01B 5/0025* (2013.01); *G01B 5/20* (2013.01); *G01B 21/20* (2013.01); *G01B 21/22* (2013.01)

(58) Field of Classification Search
CPC .. G01B 5/0004; G01B 11/005; G01B 5/0025; G01B 5/20; G01B 11/24; G01B 21/20; G01B 21/22
See application file for complete search history.

(56) References Cited

U.S. PATENT DOCUMENTS

| | | | | | |
|---|---|---|---|---|---|
| 5,617,645 | A | * | 4/1997 | Wick | G01B 11/27 250/559.23 |
| 7,269,910 | B2 | * | 9/2007 | Raab | G01B 21/045 33/503 |
| 7,376,492 | B2 | * | 5/2008 | Srack | G01B 5/0025 701/1 |
| 8,997,362 | B2 | * | 4/2015 | Briggs | G01B 5/008 33/503 |
| 9,334,066 | B2 | * | 5/2016 | Tapia | G01N 29/04 |
| 9,803,969 | B2 | * | 10/2017 | Gong | G01S 7/003 |
| 9,903,698 | B2 | * | 2/2018 | Iwatake | G01B 21/04 |
| 9,950,813 | B2 | * | 4/2018 | Hafenrichter | G01N 29/04 |
| 2006/0280355 | A1 | * | 12/2006 | Edwards | B60J 10/248 382/141 |
| 2019/0317470 | A1 | * | 10/2019 | Lankalapalli | G01B 21/047 |

OTHER PUBLICATIONS

Kozowski. (1998). Modelling and identification in robotics (1st ed. 1998.). Springer. https://doi.org/10.1007/978-1-4471-0429-2 (Year: 1998).*

* cited by examiner

*Primary Examiner* — Huy Q Phan
*Assistant Examiner* — Martin Walter Braunlich
(74) *Attorney, Agent, or Firm* — L.C. BEGIN & ASSOCIATES, PLLC

(57) ABSTRACT

A measuring arm is made up of a pair of main links pivotally connected together at one end, and a pair of shorter end links each pivotally connected at one end to an other end of each main link. A distance sensor is able to be attached to an end of one of the end links, and to either of a pair of support bases mounted at different locations on a relatively fixed structure. The measuring arm is particularly useful in inspecting contoured surfaces of seals installed on an automobile to aid in detecting defective seals.

7 Claims, 13 Drawing Sheets

$A1 = E1;$
$A2 = A1 + E2;$
$A3 = A2 + E3;$

Position Encoder 1, O1 or shoulder

$O1.X = O;$
$O1.Y = L1;$

Position Encoder 2, O2 or elbow

$O2.X = O1.X + Cos(A1) * L2)$
$O2.Y = O1.Y + Sin(A1) * L2)$

Position Encoder 3, O3 or wrist

$O3.X = O2.X - Cos(A2) * L3$
$O3.Y = O2.Y - Sin(A2) * L3$

Position of Laser Point

$x = O3.X - Sin(A3) * DL1 + Cos(A3) * (DL2 + las)$
$y = O3.Y + Cos(A3) * DL1 + Sin(A3) * (DL2 + las)$

Position of Base B Point

$x = O3.X - Sin(A3) * DT1 + Cos(A3) * DT2$
$y = O3.Y + Cos(A3) * DT1 + Sin(A3) * DT2$

FIG. 11

MEASURING ARM AND PROCESS FOR INSPECTING CONTOURS

CROSS REFERENCE TO RELATED APPLICATIONS

This application claims the benefit of U.S. provisional patent application Ser. No. 63/031,264 filed on May 28, 2020.

BACKGROUND OF THE INVENTION

This invention concerns enabling precise measurements of contours such as on seals installed on automobile bodies and doors used to prevent any entry of water into the interior of a passenger compartment thereof. Sometimes the seals fail to prevent water leakage usually because of a flaw in the contour of the seals. If a seal has a too thick contour the door will be too difficult to close.

If such a condition occurs in one automobile, this may be found in subsequent cars assembled on the same production line, and thus it is very desirable that the reason for such problem be identified as soon as possible.

It is the current practice to measure the contours of the defective seals at points along their length and compared to the proper contour in order to determine what the problem is. This is currently done by highly skilled technicians who find defects in the seals reliably.

Another inherent difficulty is that if two seals are installed at separate locations, for example one on the roof, the other on a vehicle door, a measuring device at one location often cannot scan both seals requiring another measuring device.

Thus, the necessary measurements are difficult to make, and need highly skilled personnel and much time to carry out such that such problems are quite expensive to correct.

The object of the present invention is to provide a measuring device which enables quick and accurate measurement of a contour such as automobile seals which is also relatively easy to carry out and does not require highly skilled personnel.

SUMMARY OF THE INVENTION

The above recited object is achieved by the use of a measuring arm comprised of a linkage system including two elongated main links each having one end pivotally connected to one end of the other main link so as to be able to rotate with respect to the other with the two links extending within a plane formed by the two main links.

A pair of shorter elongated end links are also included in the linkage system, each end link pivotally connected at one end to a respective one of the other ends of each main link, creating with all of the links in the linkage system lying in a common plane so as to greatly simplify the calculations as will be described below.

A rotary encoder is mounted to each of the three pivotal connections so formed so as to generate a signals corresponding to the rotary position of each of the links.

Each end of the measuring arm has an attachment plate preferably triangular fixed thereto which can be attached to either or two post support detachably mounted adjacent to a surface with which a seal is located. One of the links has a distance sensor attached thereto and the triangular attachment plate is affixed to the sensor, the attachment plate having one side cut away to not interfere with laser beam outgoing and return signals.

The one end link is angled in the middle so as to position the sensor to be better able to scan a contoured surface.

The pair of detachable base supports are each able to be detachably attached to respective different surfaces having different inclinations from each other.

The angular position and length of the main and end links enable a precise determination of where the distance sensor is located and thus enable calculation of where the distance sensor position is located.

In addition, the pivoted together links allow movement of the sensor opposite a contour of interest where it can scan and thereby inspect the same.

Each of three rotary encoders and rotary supports are mounted by rotary ball bearings to prevent any excessive friction in the connections and reduce mechanical play between the main and end links to thereby minimize any errors due to excessive friction.

The ball bearings are subjected to an axial and radial pressure by axially extending sets of tubular features projecting from two spaced apart discs which capture and compress opposite ends of the ball bearings. Screws in one set of tubular features draw the two discs together and pressure the ball bearings to eliminate any spaces which are present causing any looseness in the bearings which would affect the accuracy of the scanning of the contours.

DESCRIPTION OF THE DRAWING FIGURES

FIG. 11 is a table listing the trigonometric relationships of the features identified in FIG. 10.

FIG. 12 is a sectional view taken through one of three encoder-bearing combinations connecting together adjacent link connector ends and to also show so as to allow an arrangement of precisely controlled friction free relative pivoting of the connected links, the other encoder-bearing combinations being similar.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
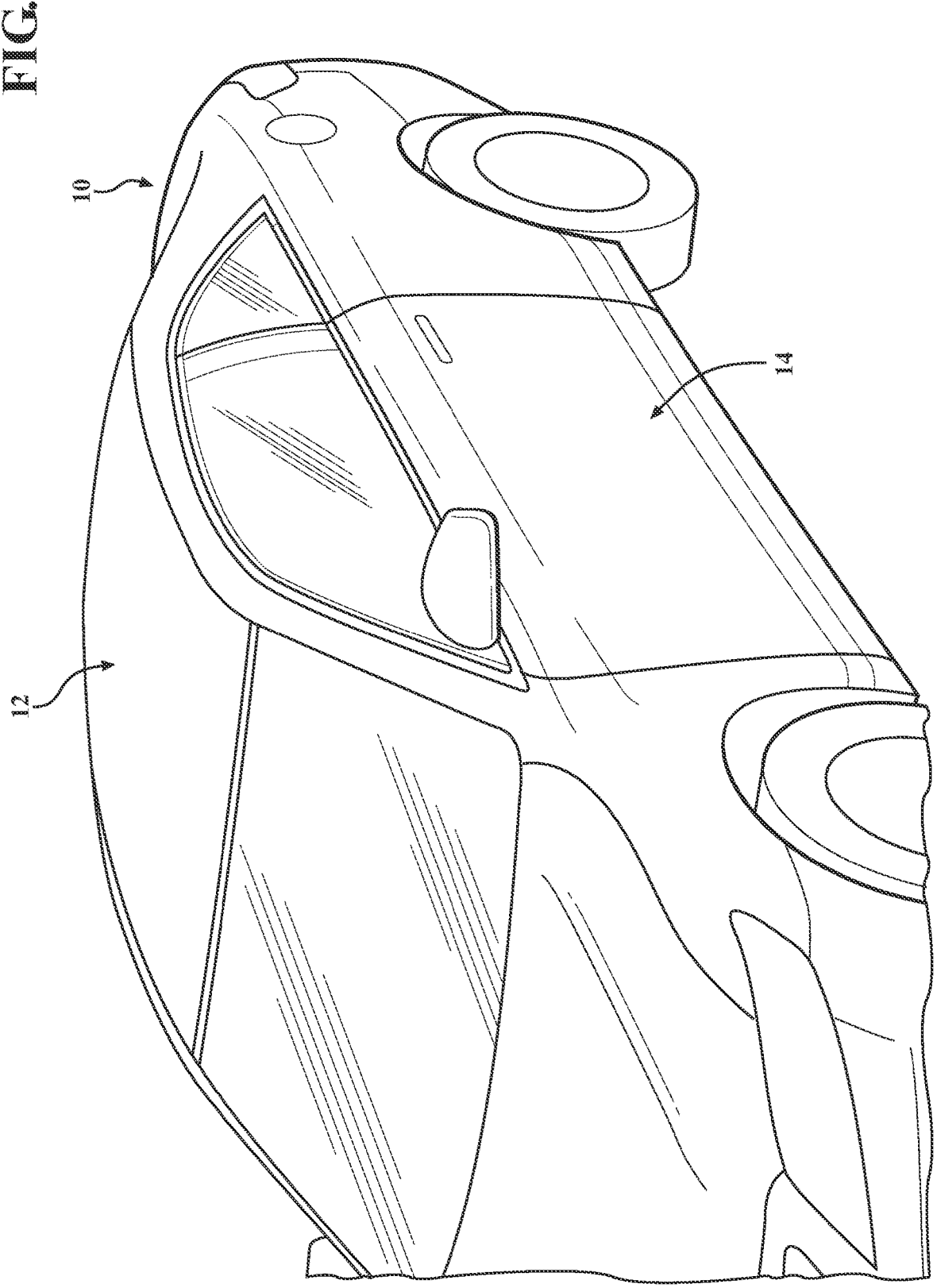
FIG. 1 is a fragmentary perspective view of an automobile having a window and body seals installed, the contour thereof to be measured.

Referring to FIG. 1, a simplified view of a portion of an automobile 10 is shown, including a body 12 having a door 14.

The door 14 may be swung open and closed in the conventional manner which must be done in order to scan each of two seals 18A, 18B as described below.

Figure 4:
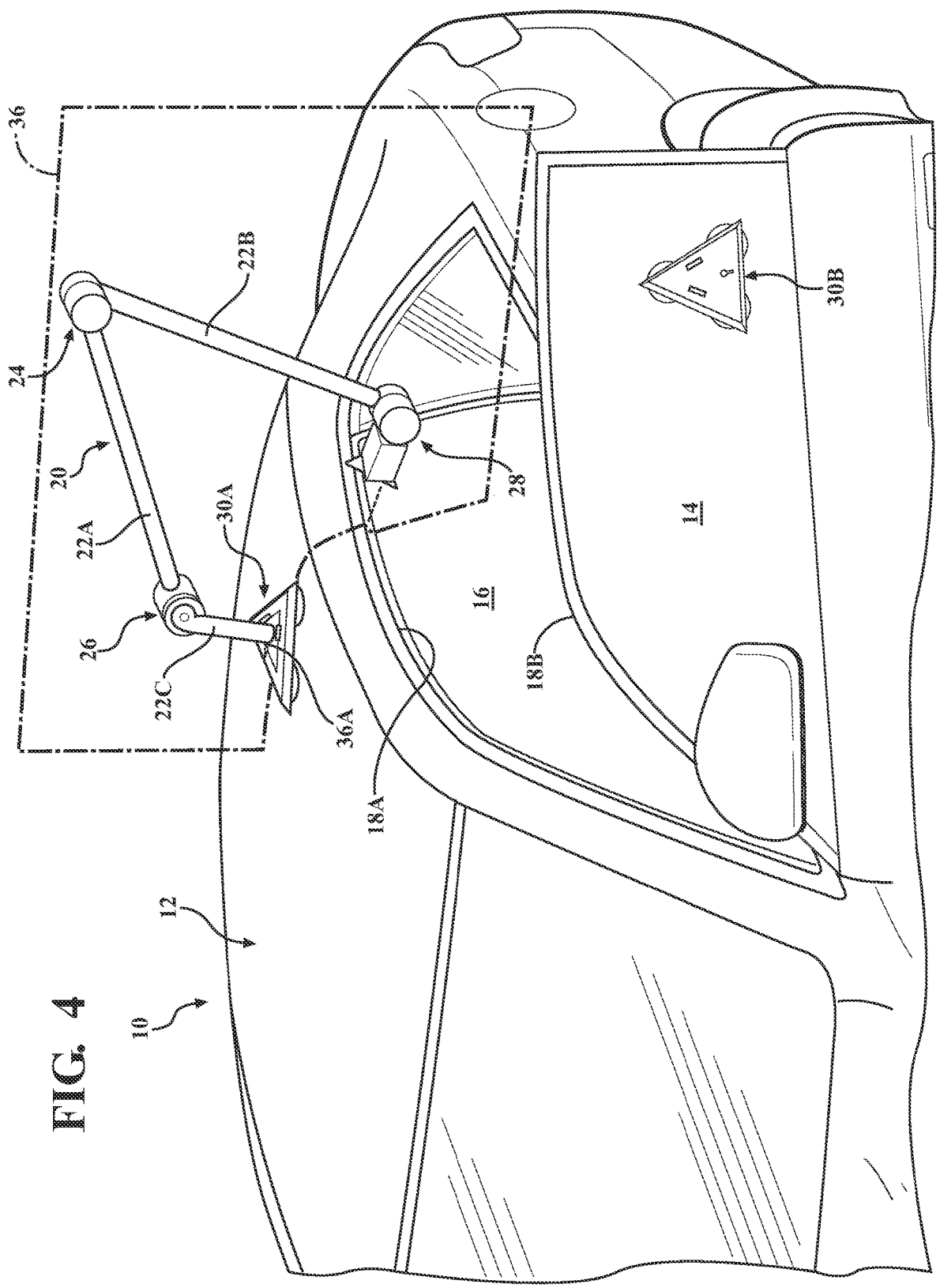
FIG. 4 is a perspective view of the automobile shown in FIGS. 1-3, with the automobile door opened and a body mounted seal being scanned by a distance sensor on the measuring arm.
Figure 5:
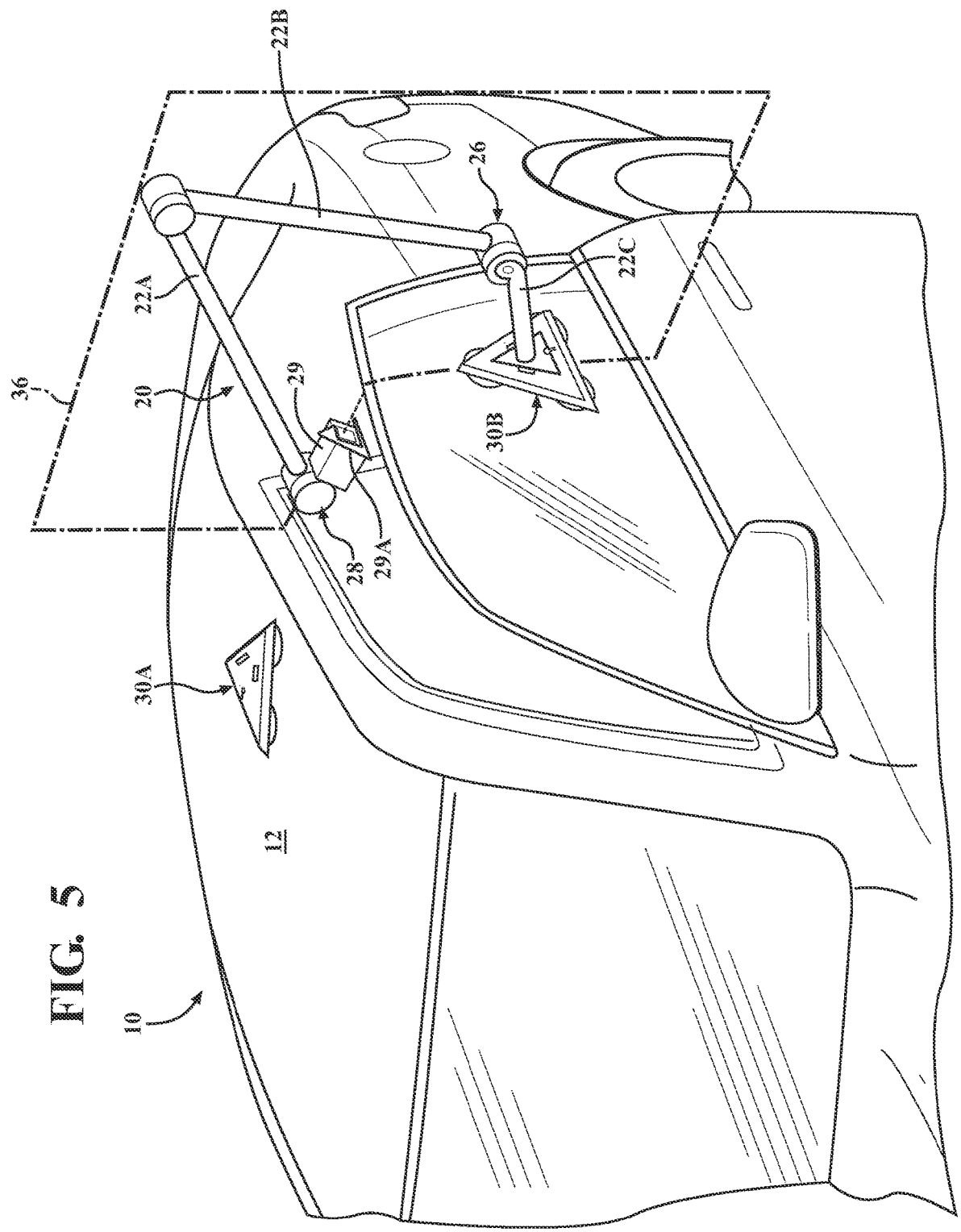
FIG. 5 is a perspective the view of a door seal being scanned by the distance sensor which is oppositely positioned in order to be able to scan the seal on the window by being mounted to the roof base.

A conventional compressible seal 18A extends around a door opening 16 defined in the body 12 (FIGS. 4 and 5) and a second seal 18B extends about the door perimeter. The two seals 18A, 18B keep out moisture when it is raining or the car is passing through a car wash. This requires that the seals must be compressed as when the door 14 is closed. The compression of the seals 18A, 18B requires some effort. Due to variations in the contour of the seals 18A, 18B or due to variations in the installation of the seals, it sometimes happens that either there is a leakage of moisture past the seal or an excessive effort is required to close the door 14 as mentioned above.

The present invention concerns a more rapid inspection process which can be carried out more quickly by less skilled personnel to alleviate the difficulties described.

The present invention includes an elongated measuring arm 20 and the manner of its use. The measuring arm 20 including two main links 22A, 22B and a pair of shorter end links 22C and 22D (end link 22D not visible in FIG. 3, see FIG. 6). The main links 22A and 22B are pivoted together at one end as described in detail below. The other end of one of the main links 22A has a pivotal connection 26 with one end of end link 22C.

The other end of the main link 22B is connected to the adjacent end link 22D (seen in FIG. 6) with a connection 28.

Figure 3:
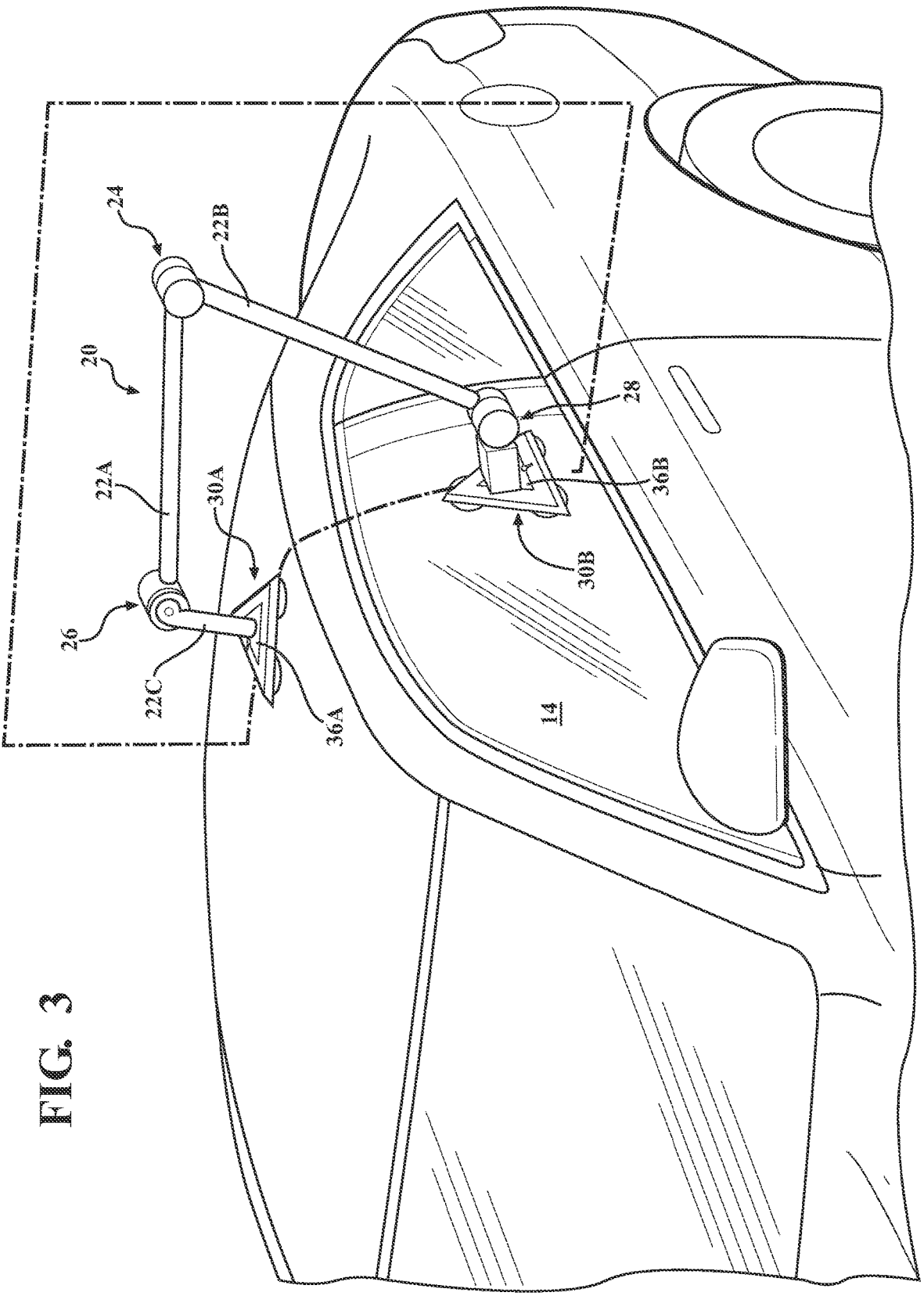
FIG. 3 is a perspective view of the automobile shown in FIGS. 1 and 2 with a measuring arm according to the present invention installed on both of the base supports to exactly be aligned with each other and a common plane shown by a broken line located thereon.
Figure 6:
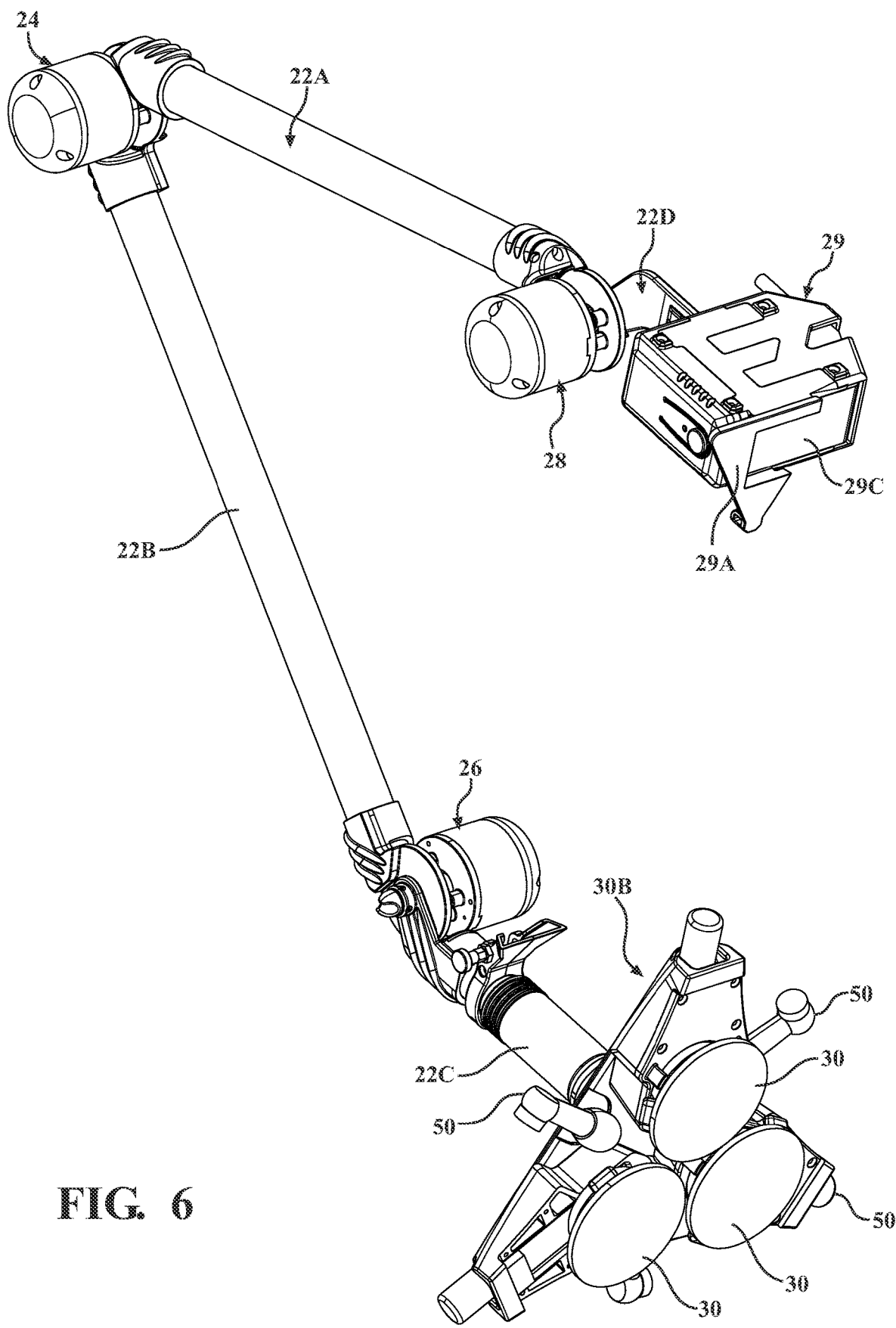
FIG. 6 is an enlarged more detailed perspective view of the measuring arm shown in FIGS. 3-5 with one end thereof installed on a door mounted base support.

As seen in FIGS. 3 and 6, a distance sensor 29 (preferably a laser beam type) is attached to angled end link 22D. An attachment triangle 29A has one side cut away as seen in FIG. 6 to expose the sensor screen 29C and allow reflected laser beams to reach the sensor screen 29C.

Figure 2:
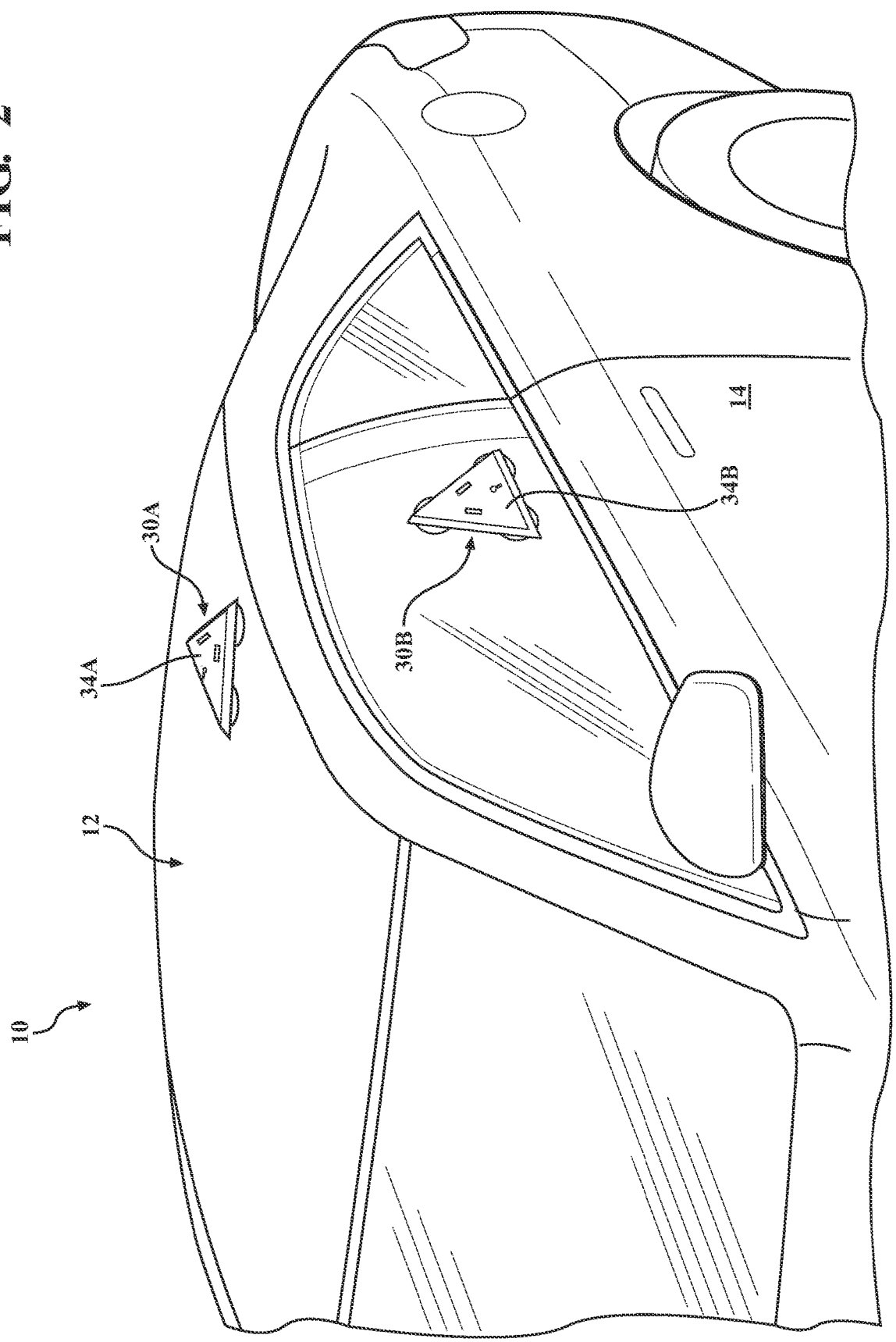
FIG. 2 is a perspective view of the automobile shown in FIG. 1 with respective support bases, one installed on the body roof and the other on the door of the automobile which has only been approximately aligned by eye with the roof mounted upper support base.

The measuring arm 20 requires a pair of identical base supports 30A, 30B (FIG. 2) detachably mounted on the roof 12 and door window 14 respectively (FIG. 2), such as by three suction cups 32 which can hold precise location and orientation of a triangular locator platform 34A, 34B included in each of the base supports 30A, 30B.

The large triangular locator platforms 34A, 34B must be very accurately positioned with respect to each other in order to properly locate the links of the measuring arm 20 when carrying out the process according to the present invention which requires that the main links 22A and 22B, and end links 22C and 22D all be located within a main plane 36 indicated by a broken line.

The locating process includes positioning one of base supports 30A on the roof 12 pointing at a seal contour measurement is desired to be taken.

Next, the other support base 30B is "eyeballed", into an approximate position i.e., placed to be at least close to being aligned with the first base support 30A.

An exact aligned location is carried out by connecting a small preferably triangular attachment plate 36 affixed to end link 22C (FIG. 7) and then slightly shifting the position of the second support base 30A as needed so that the smaller triangular attachment plate 36B on the end of the measuring arm 20 will be fit exactly within the larger triangular locator plate 38. This process is described below.

Thus, the base supports 30A, 30B are precisely aligned with each other in the plane 36. The locator triangle platform 40A is connected to the support base 20A, and the other triangular locator platform 40B is on the support base 30B.

Figure 7:
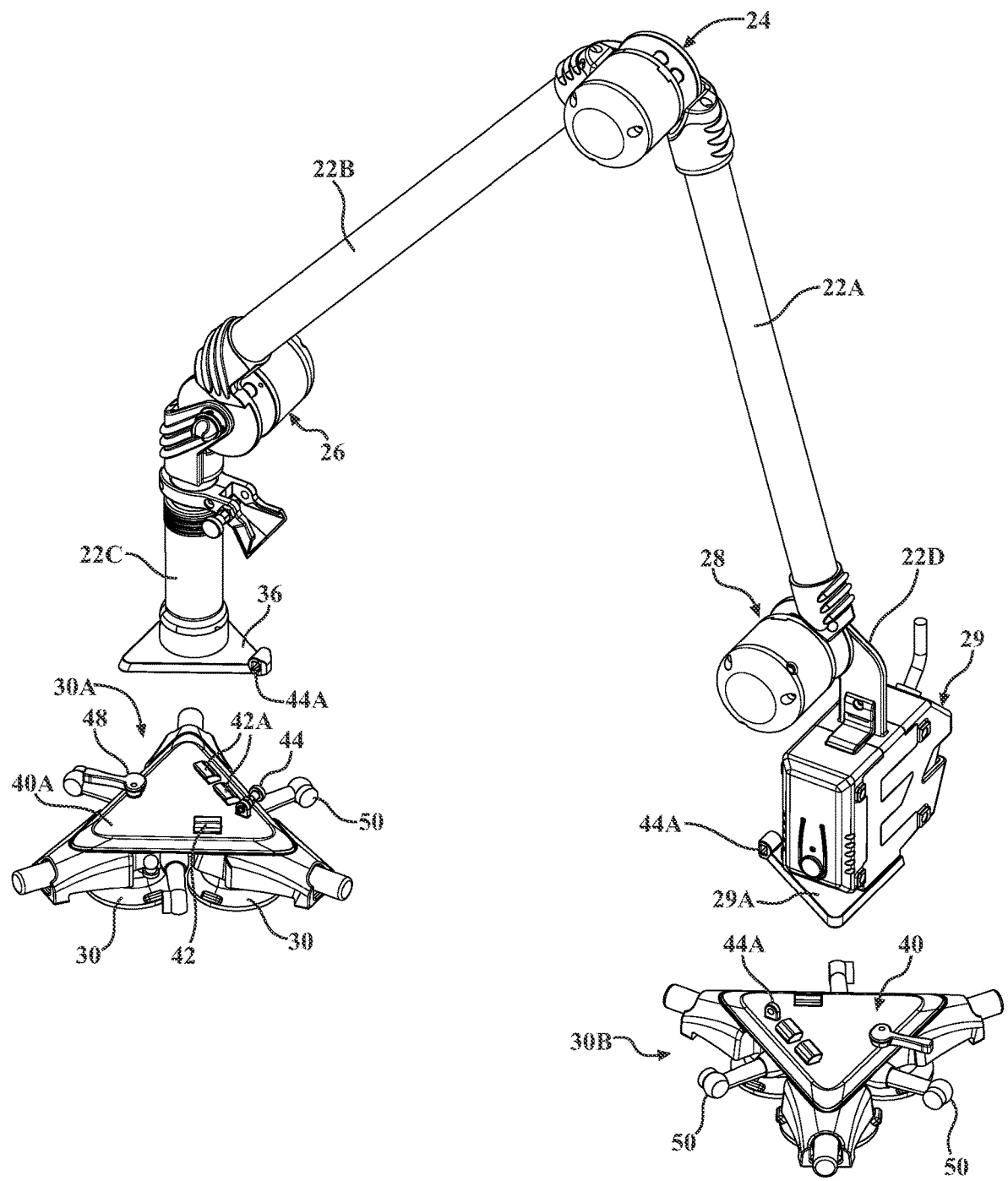
FIG. 7 is a perspective view of the measuring arm shown in FIG. 6 positioned with each end above respective base support aligned with a respective attachment plate attached to each end of the measuring arm to show the elements which enable precision alignment therebetween.
Figure 8:
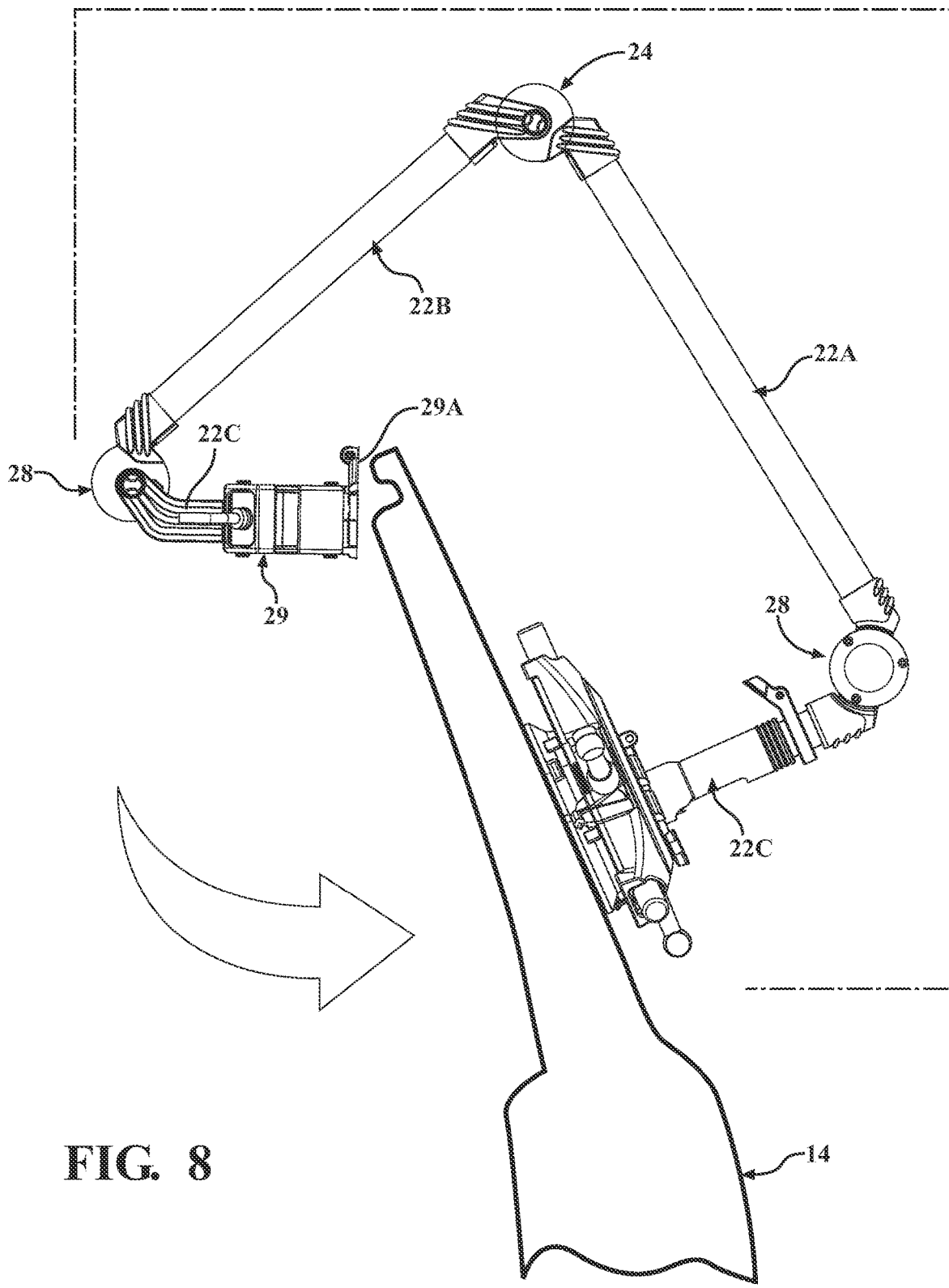
FIG. 8 is a side view of the measuring arm and base supports attached to an automobile door.
Figure 9:
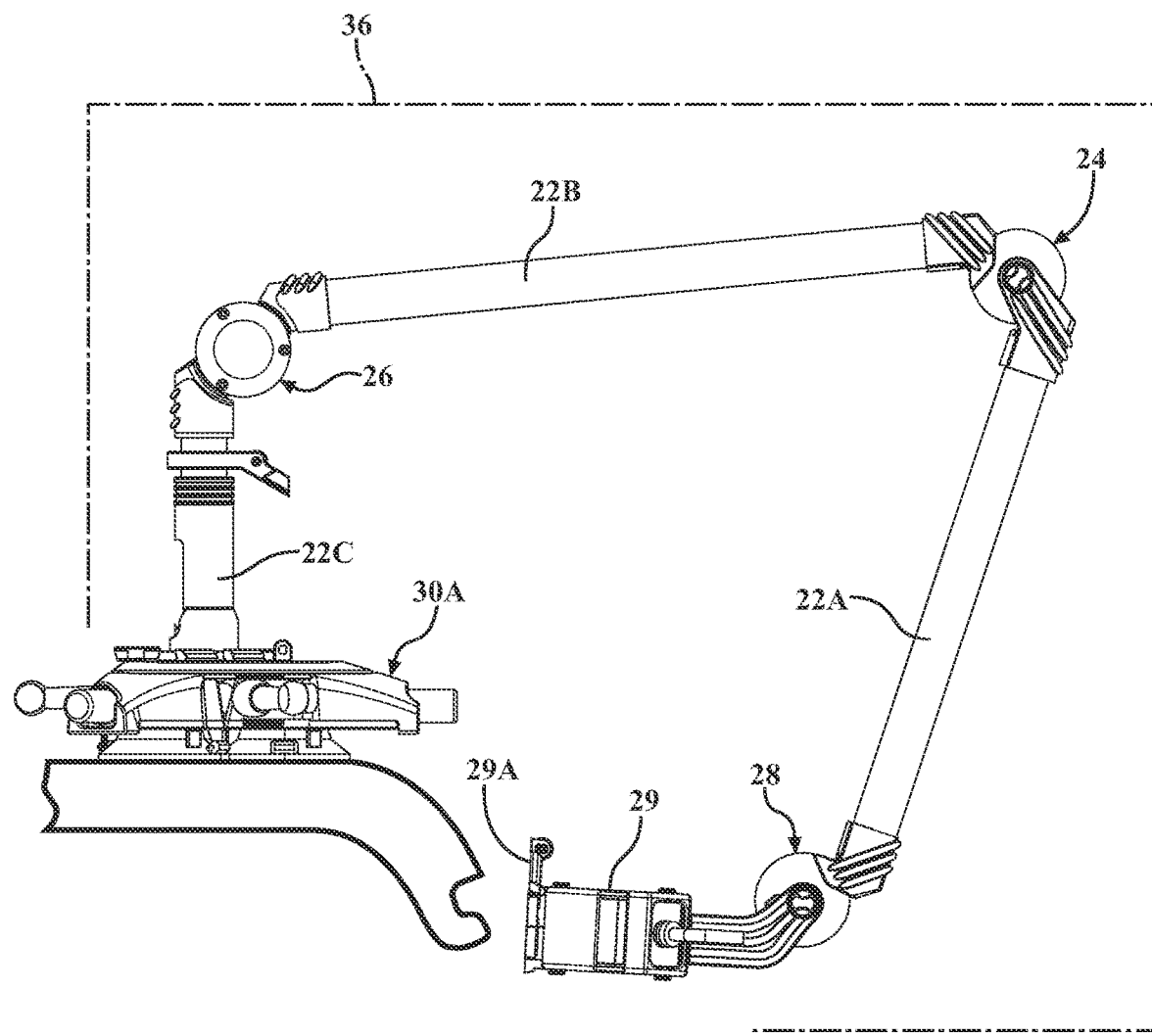
FIG. 9 is a view of the measuring arm mounted to a base support on the roof of the automobile.

The attachment plates 36 and 29A are positioned within a series of locator features 42A and 42B (FIG. 7). A spring loaded pin 44 enters a hole 44A in a tab to be on an attachment plate 29A, 36. A cam 48 when operated forces an attachment plate 36, 29A into engagement with locator features 42 to be precisely located.

In order to shift the support base 30B, so called Noga™ arms 50 (FIGS. 6 and 7) can be used as they can be loosened to facilitate shifting the support base 30B and then be retightened when perfectly aligned.

The present invention only requires calculations involving simple trigonometry constants to calculate the location of points of interest.

Figure 10:
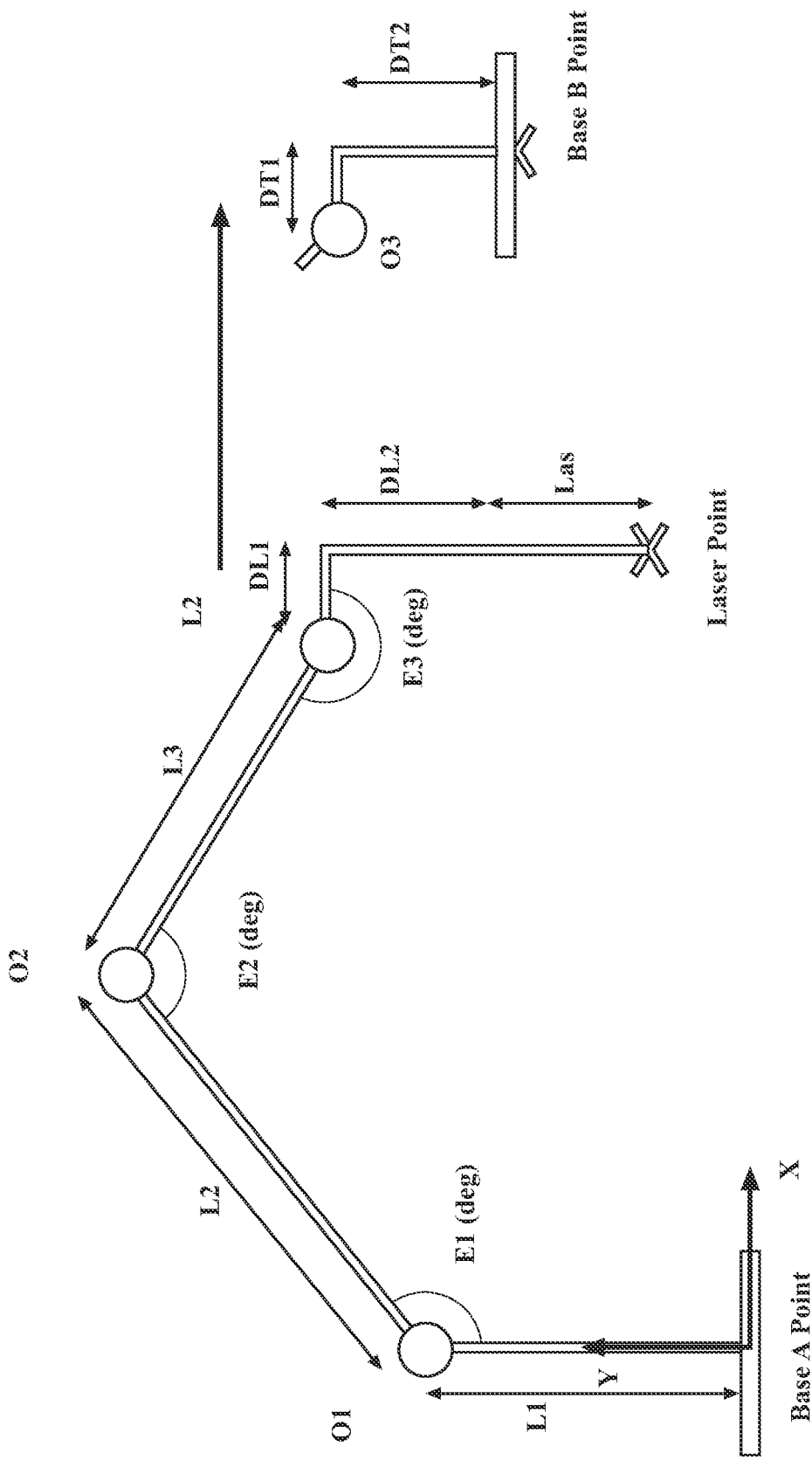
FIG. 10 is a diagram of the measuring arm with the various features thereof identified.

FIG. 10 illustrates a geometrical representation of the measuring arm 30, where the 3 pivotal connections 24, 26, 28 are referred to as O1, O2 and O3. These connections are fixedly connected to each other. The links 22A, 22B, 22C have a certain fixed length and are here respectively called L1, L2, and L3. Finally, there are two points of interest, the location of the laser point and the location of the second base support 30B.

The laser point measurement can be identified in two perpendicular directions and three segments DL1, DL2 and Las. This last value is the output of the laser distance sensor 29 that captures the distance between the measuring arm 20 and the surface of the contoured surface.

When a need arises to establish the position and orientation of the base plate, two perpendicular dimensions to the center of the secondary base DT1 and DT2 can be used.

The applied trigonometric values are represented in formula form. A first convention is the x and y location of the different hinge points (O1.X and O1.Y), (O2.X and O2.Y) and (O3.X and O3.Y). In order to apply the classic sine and cosine rules, the total angle of each articulation needs to be determined. This is represented as value A1 for the rotation of Encoder 1.A2 as the combined rotation of Encoder 1 and Encoder 2. And finally for A3 that is the combined angle of Encoders 1, 2 and 3.

For any given position of any encoder, this is a unique x and y position of the base B and a unique position of the laser end point. This position of the base B is required to establish the relationship between the two bases. The unique x and y position for the measurement point at the end of the laser is required to establish the section of the part on the object.

Figure 12:
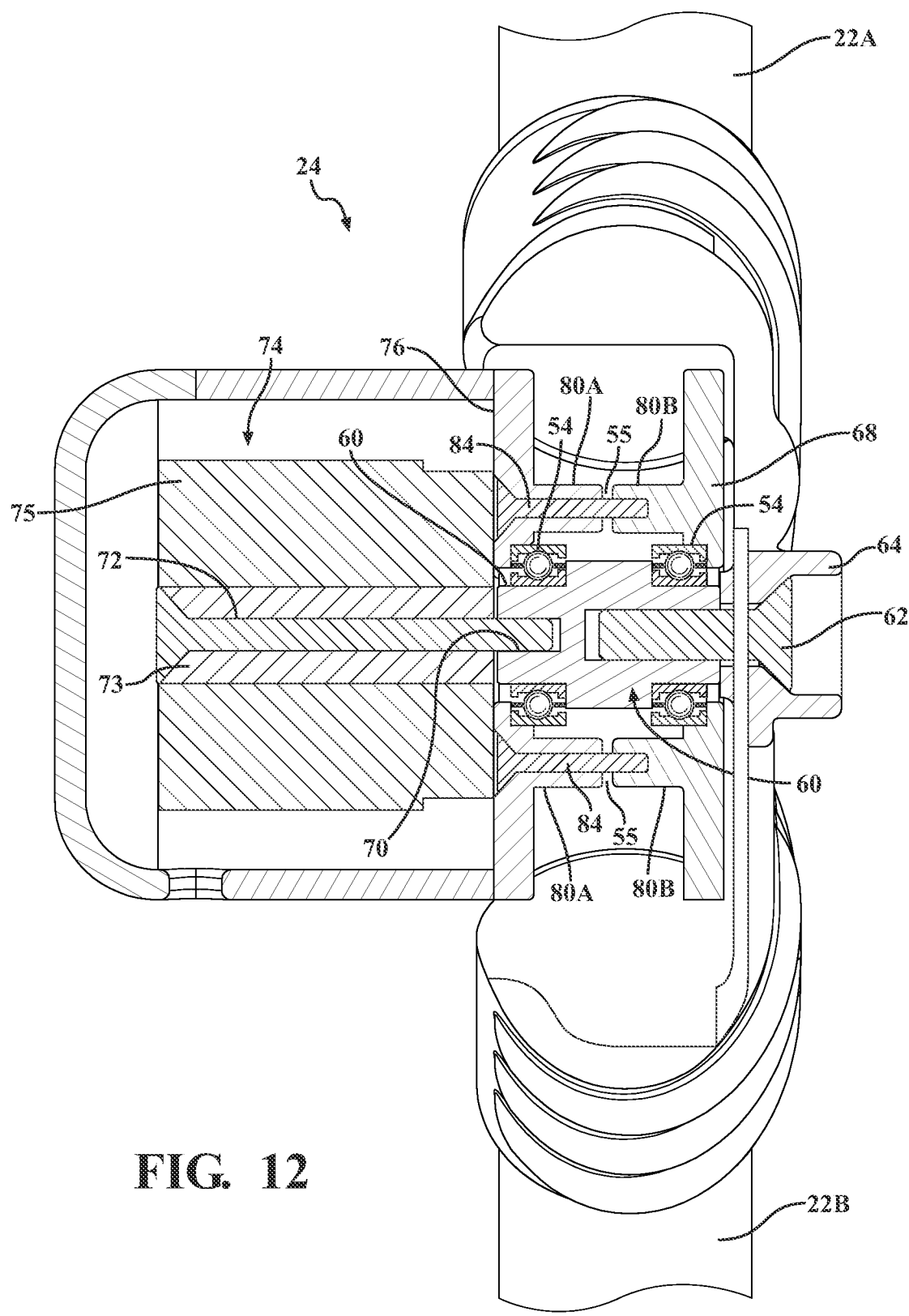

FIGS. 11 and 12 show the details of the pivotal connection 24. The pivotal connections 26, 28 are similar.

In order to minimize errors due to friction or looseness in the pivotal connections 24, 26, 28, it is desirable to reduce to minimize the frictional resistance when pivoting the same as this may cause some degree of error in the results.

For this reason, two ball bearings 54 are preferably provided in the pivotal connection 24 in order to minimize friction.

Since ball bearings typically have some inherent significant looseness between balls caused by the way they are manufactured, this also creates possible errors in determining the angle of the pivotal connections between links 22A, 22B, 22C and 22D. This looseness is eliminated by an arrangement included in the present invention described below.

Figure 13:
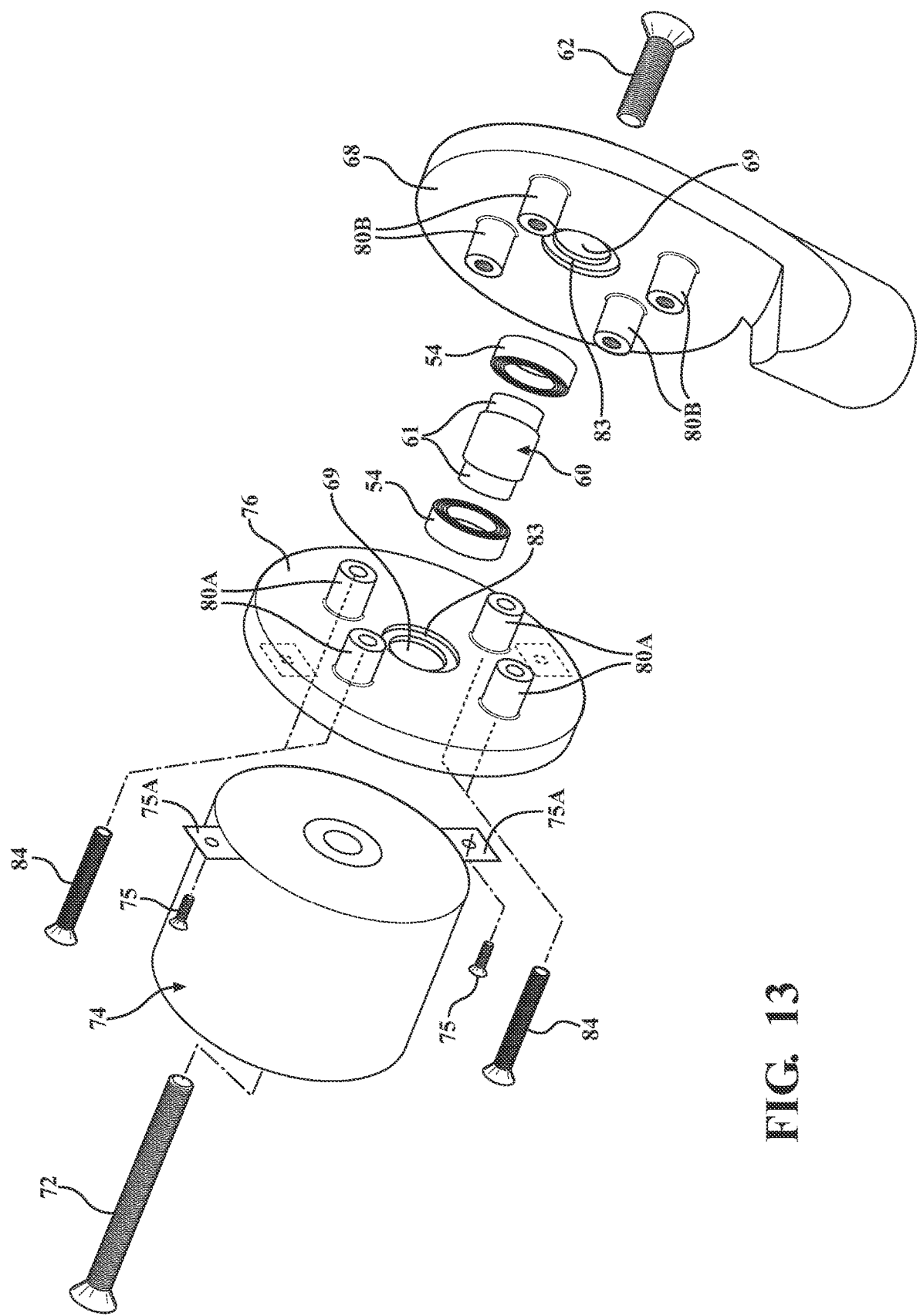
FIG. 13 is an exploded perspective view of the encoder bearing combination.

This feature includes an arrangement for axially loading the ball bearings 54 to eliminate such looseness, the arrangement shown in FIGS. 12 and 13.

The pivot connection 24 joins one end of main link end together includes sets of fitting elements A, B one of which is connected to one of the link ends 22A and the other receiving the end of the other main link 22B. An axially extending central axle 60 is connected to the other link 22B by a tapered head screw 62 which has one end extending radially to an extension 64 of a first one of the fittings. A tapered head screw 62 passes through the extension 64 and is threaded into the central axle one end rotationally connecting the extension 64 so as to cause the central axle 60 and extension 64 to rotate together.

The central axle 60 extends axially through central holes 69 in a pair of discs 68, 76 connected to the other link end 22A. A smaller diameter threaded hole 70 extends a short distance into the other end of the central axle 60.

A long second screw 72 passes completely through an associated encoder 74, the encoder 74 held abutting against the outside of one disc 76 by screws 75 and tabs 75A (FIG. 13) thereof opposite the portion abutting the first fitting end and the opposite end of the central axle 60 held in that position by the long screw 72.

A screw connection is thus made to the encoder core 73 and the second fitting B to rotate the encoder core 73.

The second fitting elements include a pair of aligned discs 68, 76 spaced apart from each other and each disc 76 has a counterbore 83 receiving ends of the ball bearings 54 therein which are also received on the reduced diameter ends of the central axle 60 with the reduced diameter ends 61 of the central axle 60 also received in the counterbore on the respective discs 68, 76.

The overall arrangement shown in FIGS. 12 and 13 includes two low friction ball bearings 54 supporting the pivoting of main links 22A and 22B and also for generating electronic signals corresponding to the angle between each of the main links 22A and 22B.

The components which pivot with the main link 22B include the short screw 62, the central axle 60, the long screw 72, and the encoder core 73 which rotate all together within the ball bearings 54. The encoder core 73 is designed to generate an electronic output signal corresponding to the extent of pivoting of the main link 22B in one direction.

The components which pivot with the main line 22A include the two discs 68, 76 which rotate the encoder outer part 75. The encoder 74 is designed in the well known manner to add the electronic signals generated by the core 73 and by the encoder outer part 75 when they are moved in opposite directions and to be subtracted when moving in the same direction so that the sum of the electronic signals correspond to the total angle between the main links 22A, 22B.

This also applies to the movement of the main link 22A and end link 22D and between main link 22B and end link 22C.

That is, the core 73 of the encoder 74 is rotated by the central axle 60 core 73 and the outer body 75 by rotation of the discs 68, 76.

The ball bearings 54 are installed on each reduced diameter end 82 of the central axle 60 and bears against a shoulder formed by the counterbore 83 in each disc 76.

Each disc 68, 76 is integrally formed with two pairs of tubular features 80A, 80B projecting axially toward each other and aligned with each other (see FIG. 13). Two tubular features 80A, 80B are arranged on each side of the center of the central axle 60 located so as to evenly exert a moderate pressure on the two discs 68, 76 causing axially directed even pressure on both of the ball bearings 54.

One set of tubular features 80A allows screws 84 to freely pass through the same, and the opposite set of tubular features 80B are threaded to engage the threads of the screws 84 in order exert the pressure on the bearings 54 to eliminate the space described. Clearance spaces 55 between the ends of the tubular features 80A, 80B are provided as shown to allow a proper pressure to be developed while still being separated as shown.

The two ball bearings 54 on the reduced diameter ends 61 of the central axle 60 prevent the two discs 68, 76 from moving together. At the same time, the respective axially projecting tubular features 80A, 80B are short enough to prevent the ends of the tubular features from coming into contact with each other when the screws are tightened to the proper extent, so that screw heads seat on tapered counterbores when the screws 84 are advanced into the threads on the other set of tubular features 80B.

The uniform pressure exerted on the two bearings 54 eliminates the gaps between the balls in the ball bearings 54 by constantly maintaining the axial pressure thereon.

The invention claimed is:

1. A measuring arm for inspecting contours on a surface of an assembly, said measuring arm made up of a series of interconnected elongated links including two main links, each main link having one end pivotally connected to one end of the other main link by a pivotal connection;

said series of links further including two end links, each end link having one end pivotally connected to another end of a respective main link by another pivotal connection;

a non-contact sensor attached to another end of one of said end links;

a first attachment plate affixed to another end of another of said end links;

a second attachment plate affixed to said non-contact sensor by moving said series of links so as to position said non-contact sensor opposite said contoured surface and then pivoting said end link with said non-contact sensor thereon;

a first base support for releasably fixing said first or second attachment plate therein; and a second base support for releasably fixing said first or second attachment plate therein, said first and second base supports adapted to be releasably fixed to respective surfaces, wherein said measuring arm is required to be fixed to the assembly containing the surface to be measured.

2. The measuring arm according to claim 1 wherein said main links and said end links are constrained to lie in a common plane so as to minimize calculations necessary to determine the location of said non-contact sensor.

3. A process for inspecting contours on surfaces adjacent fixed structures inclined from one another by use of said measuring arm according to claim 1 comprising:

detachably fixing a first base support on one of said fixed structures, and detachably fixing a second base support on another of said fixed surfaces both of said base supports centered on a common plane as well as main links and said end links as recited;

said attachment plates both engaged by locating features on said base supports to locate both of said attachment plates on said common plane.

4. A process for aligning a pair of base supports of claim 1 with each other on a pair of fixed structures, comprising the steps of detachably attaching one of said base supports on a respective one of said fixed structures so as to extend a measuring arm according to claim 1 across a contour to be inspected;

detachably mounting a second one of said base supports on the other of said fixed structures and approximately aligning the same with said one base support by eye;

installing said measuring arm according to claim 1 on an attachment plate connected to said one base support; and positioning said attachment plate with said second base support by adjustment of the position of said second base support.

5. The measuring arm according to claim 1 wherein each of said pivotal connections include a rotary encoder and a rotary support for pivoting movement of said main and end links, including a pair of ball bearings located on either end of a central axle; said ball bearings subjected to axial and radial pressure by a pair of spaced apart aligned discs, each disc having a respective set of tubular features aligned with an opposing set of tubular features from an opposing disc, said tubular features having juxtaposed spaced apart ends;

a screw installed in each of said tubular features enabling drawing said tubular features and discs together with a space remaining between ends of said tubular features by tightening of said screws;

which discs engage axially with said ball bearings to create said axial pressure and thereby eliminate any radial play.

6. A measuring arm for inspecting contours on a surface of an assembly, said measuring arm made up of a series of interconnected elongated links including two main links, each main link having one end pivotally connected to one end of the other main link by a pivotal connection;

said series of links further including two end links, each end link having one end pivotally connected to another end of a respective main link by another pivotal connection;

a non-contact sensor attached to another end of one of said end links, the respective end link angled in the middle;

a first attachment plate affixed to another end of another of said end links;

a second attachment plate affixed to said non-contact sensor;

a first base support adapted for releasably fixing said first or second attachment plate therein; and a second base support adapted for releasably fixing said first or second attachment plate therein, said first and second base supports in substantial alignment with each other on the assembly, wherein said first and second base supports are adapted to be releasably fixed to two respective surfaces, and wherein said measuring arm is required to be fixed to the assembly containing the surface to be measured.

7. The measuring arm according to claim 6 wherein each of said pivotal connections include a rotary encoder and a rotary support for pivoting movement of said main and end links, including a pair of ball bearings located on either end of a central axle; said ball bearings subjected to axial and radial pressure by a pair of spaced apart discs, wherein a first disc has a first plurality of tubes, and a second disc has a corresponding second plurality of tubes extending toward the first plurality of tubes, each tube in the first plurality of tubes axially aligned with a corresponding tube in the second plurality of tubes, with spaced apart ends;

a plurality of screws, each of said plurality of screws installed in a respective one of the first plurality of tubes and extending into a respective one of the second plurality of tubes, thereby enabling drawing said discs and aligned tubes together with a space remaining between ends of said aligned tubes, by tightening of said screws.

* * * * *